(12) United States Patent
Masaoka

(10) Patent No.: US 8,104,052 B2
(45) Date of Patent: Jan. 24, 2012

(54) SLOT-IN TYPE DISK APPARATUS INCLUDING A BASE BODY AND LID FORMING A CHASSIS SHEATH PROVIDED WITH A BEZEL

(75) Inventor: Kengo Masaoka, Ehime (JP)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 11/914,541

(22) PCT Filed: May 15, 2006

(86) PCT No.: PCT/JP2006/309675
§ 371 (c)(1),
(2), (4) Date: Mar. 2, 2009

(87) PCT Pub. No.: WO2006/123622
PCT Pub. Date: Nov. 23, 2006

(65) Prior Publication Data
US 2009/0213721 A1  Aug. 27, 2009

(30) Foreign Application Priority Data
May 17, 2005  (JP) .................. 2005-144570

(51) Int. Cl.
G11B 33/14  (2006.01)
(52) U.S. Cl. ..................................... 720/646

(58) Field of Classification Search .............. 720/646, 720/647, 600, 628, 655, 617; 361/724, 725, 361/679.33, 679.55; 312/223.2
See application file for complete search history.

(56) References Cited

U.S. PATENT DOCUMENTS

| | | | | |
|---|---|---|---|---|
| 5,423,605 A * | 6/1995 | Liu | | 312/265.6 |
| 6,971,111 B2 * | 11/2005 | Chuang et al. | | 720/601 |
| 2003/0235129 A1 * | 12/2003 | Wang | | 369/75.1 |
| 2005/0060734 A1 * | 3/2005 | Aoyama et al. | | 720/706 |
| 2005/0223398 A1 * | 10/2005 | Fujimura et al. | | 720/601 |
| 2005/0289578 A1 * | 12/2005 | Wan et al. | | 720/671 |

OTHER PUBLICATIONS

International Search Report Dated Sep. 5, 2006.

* cited by examiner

*Primary Examiner* — Angel A. Castro
(74) *Attorney, Agent, or Firm* — Dickinson Wright PLLC

(57) ABSTRACT

A slot-in type disk apparatus includes a base body and a lid forming a chassis sheath. A front surface of the chassis sheath is provided with a bezel formed with a disk-insertion opening. The bezel includes lid pawls projecting toward the lid from the bezel which is generally parallel to the disk-insertion opening. The bezel also includes steps formed on both sides of the lid pawls. The lid includes lid-side holes which are engaged with the lid pawls, respectively, and includes lid-side projections formed on both sides of the lid-side holes. In a state in which the lid pawls are engaged with the lid-side holes, the lid-side projections abut against the steps.

9 Claims, 4 Drawing Sheets

SLOT-IN TYPE DISK APPARATUS INCLUDING A BASE BODY AND LID FORMING A CHASSIS SHEATH PROVIDED WITH A BEZEL

TECHNICAL FIELD

The present invention relates to a disk apparatus for recording or replaying into or from a disk-like recording medium such as a CD and a DVD, and more particularly, to a slot-in type disk apparatus capable of directly inserting a disk from outside.

BACKGROUND TECHNIQUE

A bezel (front panel) is attached to a slot-in type disk apparatus. The bezel is provided at its front portion with a disk-insertion opening. Since the bezel is an exterior part, it is necessary to reliably attach the bezel to the disk apparatus so that when the disk apparatus is used, the bezel does not fall out or deviation is not generated.

Especially in the case of a bezel used for a thin disk apparatus, since it is necessary that the bezel is provided at its central portion with the disk-insertion opening, as compared with a tray type bezel, a disposing position of a screw or a hanging pawl for attaching the bezel to the disk apparatus body is limited.

DISCLOSURE OF THE INVENTION

Problem to be Solved by the Invention

Therefore, it is necessary to form a member for mounting a bezel on a disk apparatus in a narrow space.

Especially, when a chassis sheath comprises a base body and a lid, the lid is deformed easily.

However, even if the lid is deformed, coming off or deviation of the bezel must be prevented effectively.

Hence, it is an object of the present invention to effectively prevent the bezel and the lid from deviating from each other or coming off.

Means for Solving Problem

According to a first aspect of the present invention, there is provided a slot-in type disk apparatus in which a base body and a lid constitute a chassis sheath, a front surface of the chassis sheath is provided with a bezel, and a disk is inserted directly from a disk-insertion opening formed in the bezel, wherein the bezel includes a lid pawl projecting toward the lid from one side of the bezel which is in parallel to the disk-insertion opening, and steps formed on both sides of the lid pawl, the lid includes a lid-side hole which is engaged with the lid pawl, and lid-side projections formed on both sides of the lid-side hole, and the lid-side projections abut against the steps in a state in which the lid pawl is engaged with the lid-side hole.

According to a second aspect of the invention, in the slot-in type disk apparatus of the first aspect, the apparatus further comprises at least three more lid pawls, wherein at least the three lid pawls are disposed at equal distances from each other, the steps are formed on both sides of at least one disposed at the center of the lid pawls, and the lid-side projections are formed on both sides of at least the lid-side hole disposed at the center.

According to a third aspect of the invention, in the slot-in type disk apparatus of the second aspect, the apparatus further comprises four lid pawls, wherein two disposed at the center of the four lid pawls are formed at their both sides with the steps, and the lid-side projections are formed on both sides of at least the two lid-side holes disposed at the center.

According to a fourth aspect of the invention, in the slot-in type disk apparatus of any one of the first to third aspect, the step is one continuous step which is in parallel to the disk-insertion opening.

According to a fifth aspect of the invention, in the slot-in type disk apparatus of the first aspect, the bezel includes a first base body pawl projecting toward the base body from the other side of the bezel which is in parallel to the disk-insertion opening, the base body includes a first base body-side hole which is engaged with the first base body pawl, and the first base body pawl is engaged with the first base body-side hole in a state in which the lid pawl is engaged with the lid-side hole.

According to a sixth aspect of the invention, in the slot-in type disk apparatus of the first aspect, the bezel includes second base body pawl projecting toward the base body from both sides of the bezel which are perpendicular to the disk-insertion opening, the base body includes second base body-side holes which are engaged with the second base body pawls, and the second base body pawls are engaged with the second base body-side holes in a state in which the lid pawl is engaged with the lid-side hole.

According to a seventh aspect of the invention, in the slot-in type disk apparatus of the first aspect, the bezel includes a base body-side projection formed on a side of the first base body pawl, the base body includes a third base body-side hole formed on a side of the first base body pawl, and the base body-side projection is inserted in the third base body-side hole in a state in which the lid pawl is engaged with the lid-side hole.

Effect of the Invention

According to the present invention, even if the lid is deformed, it is possible to prevent the bezel and the lid from deviating or coming off from each other without exerting influence on the engagement between the lid pawl and the lid-side hole by abutting the lid-side projections against the steps formed on both sides of the lid pawl.

EXPLANATION OF SYMBOLS

Figure 1:
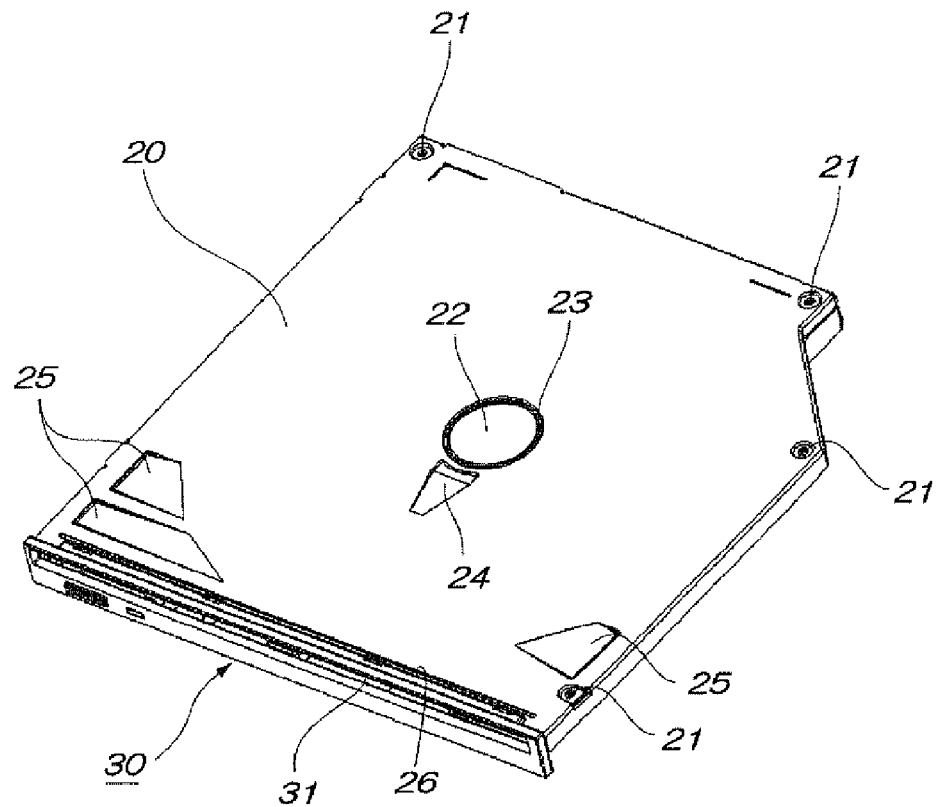
FIG. 1 is a perspective view of a slot-in type disk apparatus on the side of a lid according to an embodiment of the present invention.

10 base body
16A, 16B first base body-side hole
17A, 17B second base body-side hole 18A, 18B third base body-side hole
20 lid
27A, 27B, 27C, 27D lid-side hole
28A, 28B lid-side projection
30 bezel
31 disk-insertion opening
32 step
33A, 33B, 33C, 33D lid pawl
34A, 34B first base body pawl
35A, 35B base body-side projection
36A, 36B second base body pawl

BEST MODE FOR CARRYING OUT THE INVENTION

According to a first aspect of the present invention, there is provided a slot-in type disk apparatus in which a base body and a lid constitute a chassis sheath, a front surface of the chassis sheath is provided with a bezel, and a disk is inserted directly from a disk-insertion opening formed in the bezel, wherein the bezel includes a lid pawl projecting toward the lid from one side of the bezel which is in parallel to the disk-insertion opening, and steps formed on both sides of the lid pawl, the lid includes a lid-side hole which is engaged with the lid pawl, and lid-side projections formed on both sides of the lid-side hole, and the lid-side projections abut against the steps in a state in which the lid pawl is engaged with the lid-side hole. According to this aspect, even if the lid is deformed, it is possible to prevent the bezel and the lid from deviating or coming off from each other without exerting influence on the engagement between the lid pawl and the lid-side hole by abutting the lid-side projections against the steps formed on both sides of the lid pawl.

According to a second aspect of the invention, in the slot-in type disk apparatus of the first aspect, the apparatus further comprises at least three lid pawls, wherein at least the three lid pawls are disposed at equal distances from each other, the steps are formed on both sides of at least one disposed at the center of the lid pawls, and the lid-side projections are formed on both sides of at least the lid-side hole disposed at the center. According to this aspect, since the lid-side projections formed on both sides of the lid pawl abut against the steps at the center of the lid which is prone to be deformed, it is possible to prevent the bezel and the lid from deviating or coming off from each other without exerting influence on the engagement between the lid pawl and the lid-side hole.

According to a third aspect of the invention, in the slot-in type disk apparatus of the second aspect, the apparatus further comprises four lid pawls, wherein two disposed at the center of the four lid pawls are formed at their both sides with the steps, and the lid-side projections are formed on both sides of at least the two lid-side holes disposed at the center. According to this aspect, since the lid-side projections formed on both sides of the lid pawl abut against the steps at two locations of the center of the lid which is prone to be deformed, it is possible to prevent the bezel and the lid from deviating or coming off from each other without exerting influence on the engagement between the lid pawl and the lid-side hole.

According to a fourth aspect of the invention, in the slot-in type disk apparatus of any one of the first to third aspect, the step is one continuous step which is in parallel to the disk-insertion opening. According to this aspect, the strength of the bezel in the longitudinal direction can be enhanced by the continuous steps, and it is possible to prevent the bezel itself from being deformed.

According to a fifth aspect of the invention, in the slot-in type disk apparatus of the first aspect, the bezel includes a first base body pawl projecting toward the base body from the other side of the bezel which is in parallel to the disk-insertion opening, the base body includes a first base body-side hole which is engaged with the first base body pawl, and the first base body pawl is engaged with the first base body-side hole in a state in which the lid pawl is engaged with the lid-side hole. According to this aspect, it is possible to prevent the led and the bezel from deviating or coming off from each other by preventing the bezel from deviating or coming off from the side of the base body.

According to a sixth aspect of the invention, in the slot-in type disk apparatus of the first aspect, the bezel includes second base body pawl projecting toward the base body from both sides of the bezel which are perpendicular to the disk-insertion opening, the base body includes second base body-side holes which are engaged with the second base body pawls, and the second base body pawls are engaged with the second base body-side holes in a state in which the lid pawl is engaged with the lid-side hole. According to this aspect, it is possible to prevent the led and the bezel from deviating or coming off from each other by preventing the base body and the bezel from deviating or coming off from each other on both sides of the bezel.

According to a seventh aspect of the invention, in the slot-in type disk apparatus of the first aspect, the bezel includes a base body-side projection formed on a side of the first base body pawl, the base body includes a third base body-side hole formed on a side of the first base body pawl, and the base body-side projection is inserted in the third base body-side hole in a state in which the lid pawl is engaged with the lid-side hole. According to this aspect, the base body-side projection and the third base body-side hole prevent the bezel and the base body from deviating or coming off from each other. With this, it is possible to secure the engaged state between the first base body pawl and the first base body-side hole.

EMBODIMENT

A slot-in type disk apparatus according to an embodiment of the present invention will be explained.

Figure 2:
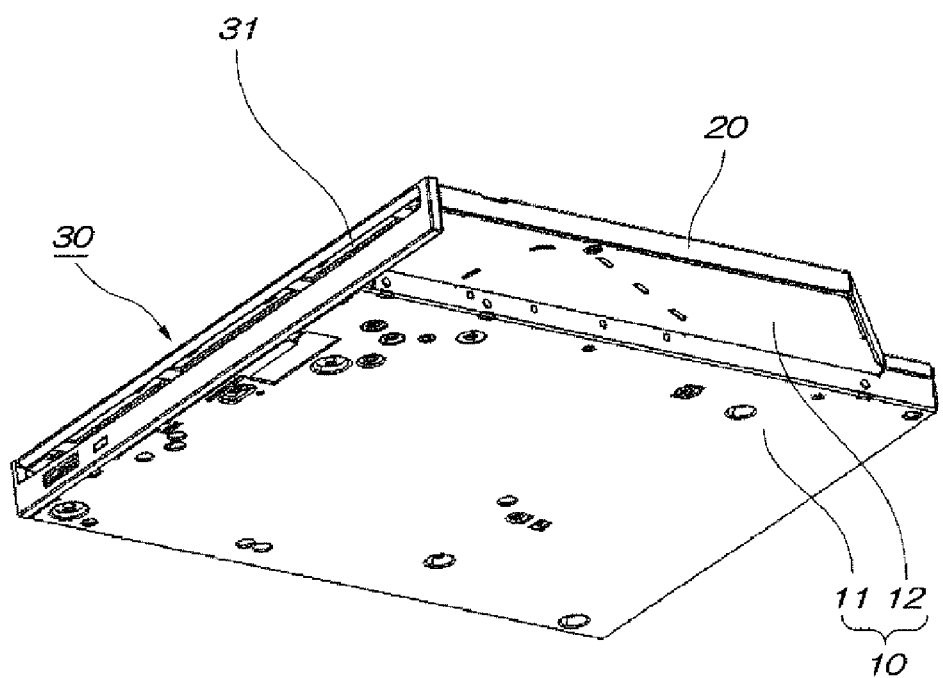
FIG. 2 is a perspective view of the disk apparatus on the side of a base body.

FIG. 1 is a perspective view of the slot-in type disk apparatus on the side of a lid according to the embodiment. FIG. 2 is a perspective view of the disk apparatus on the side of a base body.

According to the slot-in type disk apparatus of the embodiment, a base body 10 and lid 20 constitute a chassis sheath, and a bezel 30 is attached to a front surface of the chassis sheath. The disk apparatus of the embodiment is a slot-in type disk apparatus in which a disk is directly inserted from a disk-insertion opening 31 formed in the bezel 30.

Parts which realize a recording and replaying function onto or from a disk and a loading function of a disk are attached to the base body 10.

The base body 10 is formed with a deep bottom 11 and a shallow bottom 12 with respect to the lid 20. A wing portion extending from a front surface to a rear surface is formed by the shallow bottom 12.

A plurality of screw holes 21 are formed in an outer edge of the lid 20, and the lid 20 is mounted on the base body 10 through screws.

The lid 20 is formed at its central portion with an opening 22. The opening 22 is a circular opening having a radius greater than a center hold of a disk. Therefore, the opening 22 has a greater radius than a hub of a spindle motor which is fitted into the center hold of the disk.

The opening 22 is provided at its outer periphery with a restriction 23 projecting toward the base body 10. The opening 22 is also provided with a restriction 24 which is tapered toward the bezel 30. This restriction 24 forms a convex guide on the side of the base body 10. The lid 20 is formed with a plurality of restrictions 25, and the restrictions 25 form a convex guide on the side of the base body 10. A disk inserted from the disk-insertion opening 31 is guided by the convex guides formed by the restrictions 25. The restrictions 23, 24 and 25 enhance the strength of the lid 20. A restriction 26 having a predetermined length and projecting on the opposite direction from the base body 10 is formed near a side of the lid 20 on the side of the bezel 30.

Figure 3:
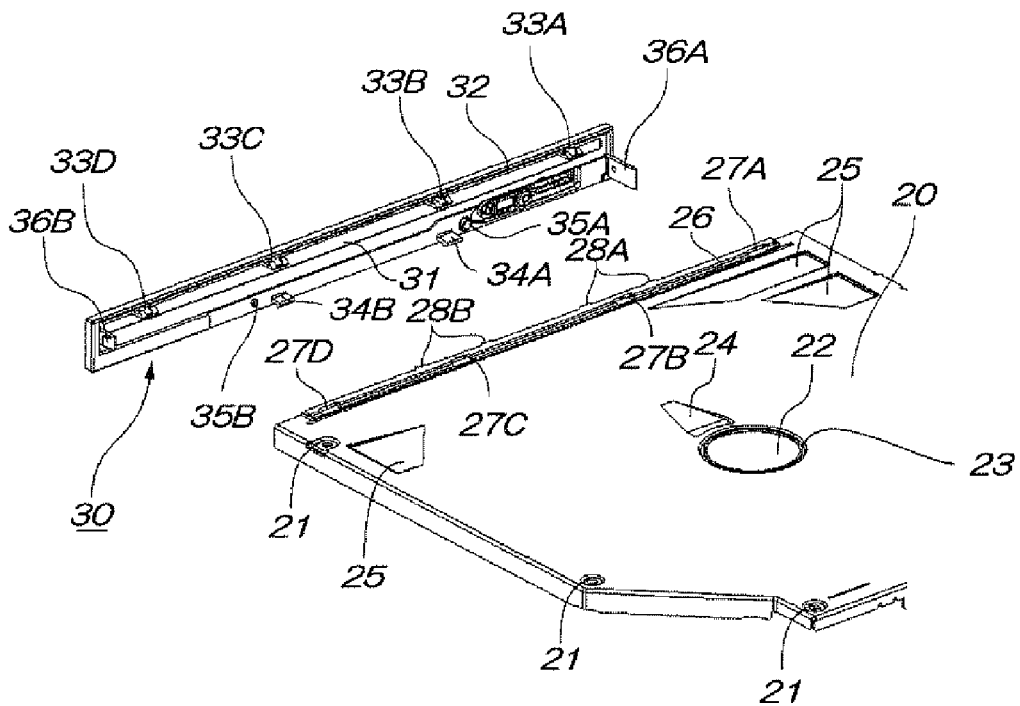
FIG. 3 is an exploded perspective view of a lid and a bezel of the disk apparatus.
Figure 4:
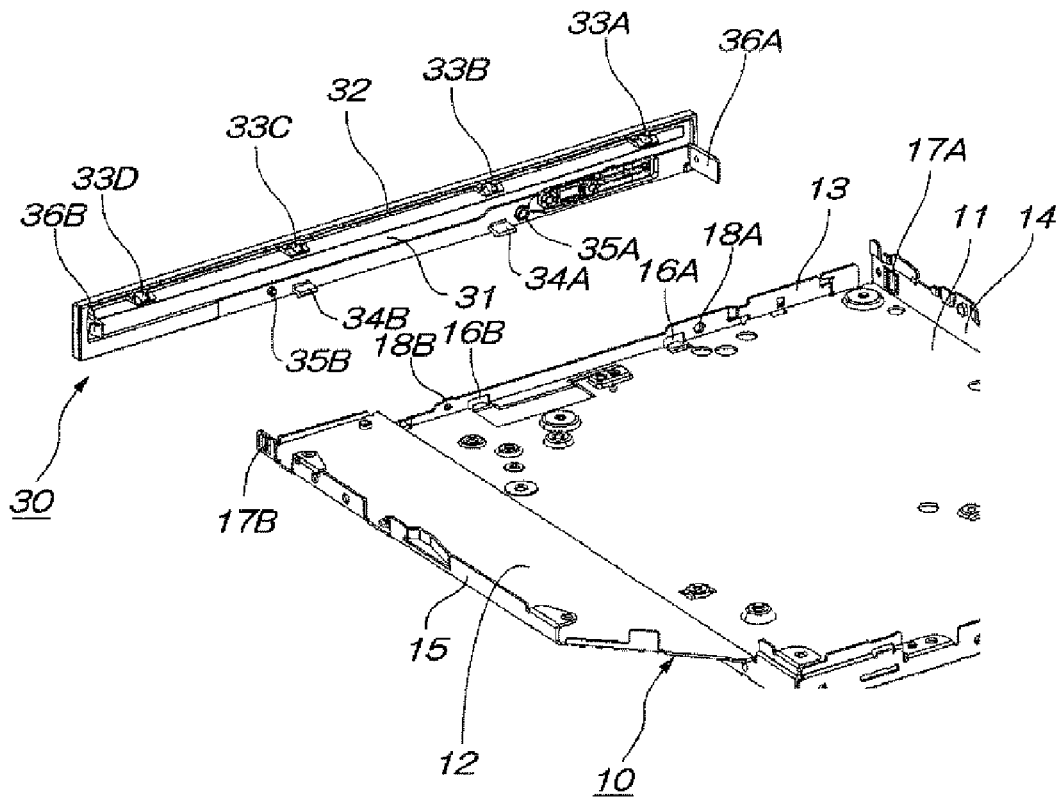
FIG. 4 is an exploded perspective view of the base body and the bezel of the disk apparatus.
Figure 5:
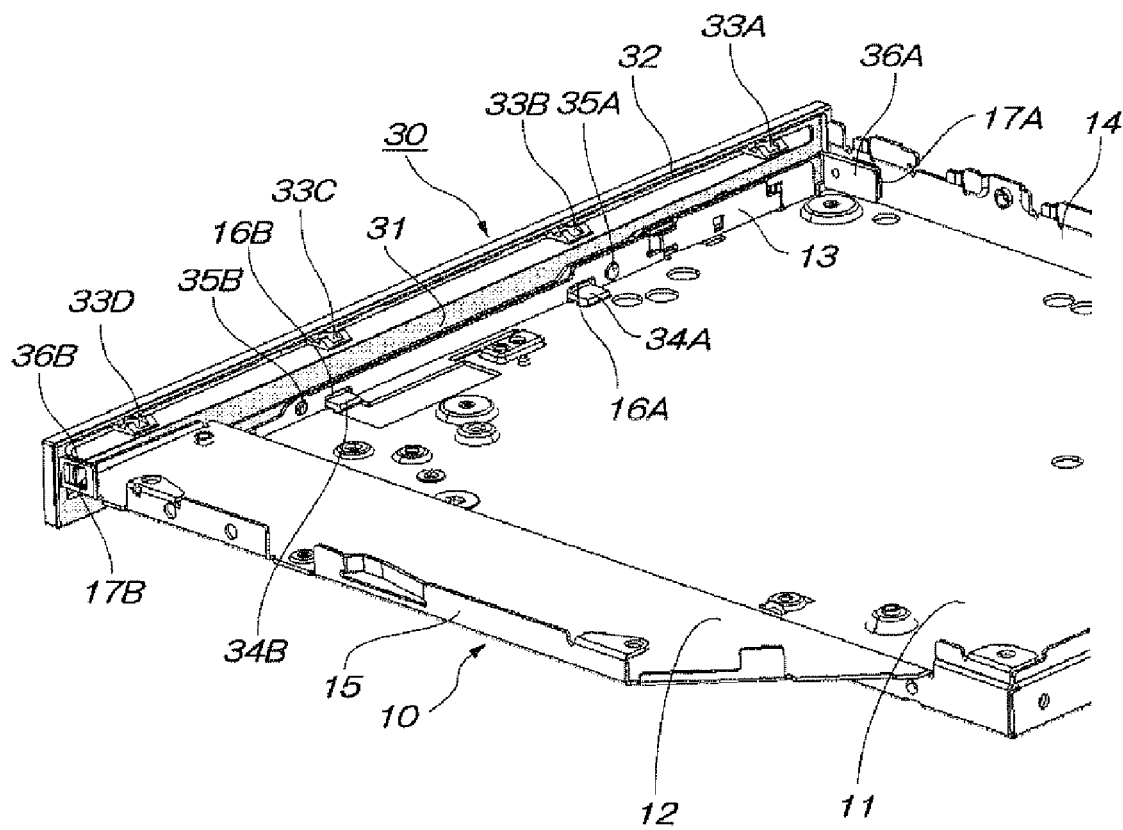
FIG. 5 is a perspective view showing an assembled state of the base body and the bezel of the disk apparatus.
Figure 6:
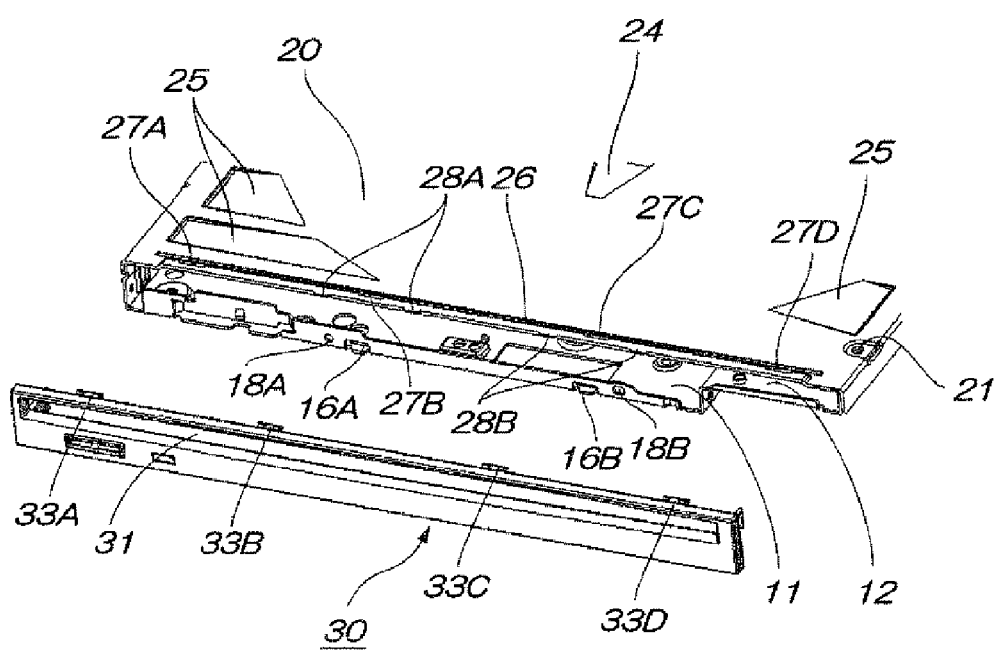
FIG. 6 is a perspective view showing an exploded state of a chassis body and the bezel of the disk apparatus.
Figure 7:
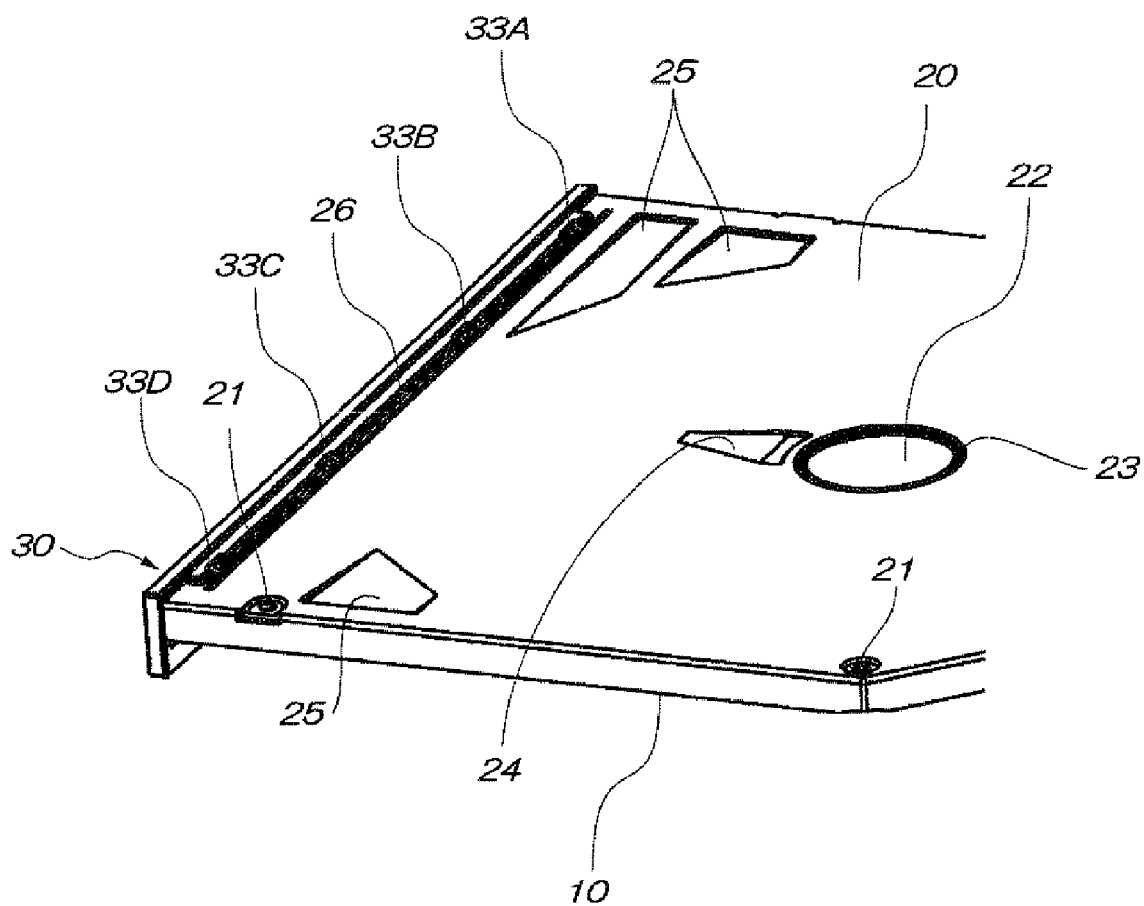
FIG. 7 is a perspective view of an essential portion showing an assembled state of the disk apparatus.

FIG. 3 is an exploded perspective view of the lid and the bezel of the disk apparatus of the embodiment. FIG. 4 is an exploded perspective view of the base body and the bezel of the disk apparatus. FIG. 5 is a perspective view showing an assembled state of the base body and the bezel of the disk apparatus. FIG. 6 is a perspective view showing an exploded state of a chassis body and the bezel of the disk apparatus. FIG. 7 is a perspective view of an essential portion showing an assembled state of the disk apparatus.

First, a structure of the base body 10 will be explained using especially FIGS. 4 to 6.

A sidewall 13 rises from one side of the base body 10 on the side of the bezel 30, a sidewall 14 rises from one side of the deep bottom 11, and a sidewall 15 rises from one side of the shallow bottom 12.

The sidewall 13 is formed with first base body-side holes 16A and 16B. The sidewall 14 is formed with a second base body-side hole 17A, and the sidewall 15 is formed with a second base body-side hole 17B. A third base body-side hole 18A is formed outside of the first base body-side hole 16A of the sidewall 13, and a third base body-side hole 18B is formed outside of the first base body-side hole 16B of the sidewall 13. It is preferable that the first base body-side holes 16A and 16B are formed at locations to divide a widthwise length of the bezel 30 into three.

Next, a structure of the lid 20 will be explained using especially FIGS. 3 to 6.

The restriction 26 of the lid 20 is formed with lid-side holes 27A, 27B, 27C and 27D formed at equal distances from one another. The lid-side holes 27A and 27D are provided sideway of the lid 20, and the lid-side holes 27B and 27C are provided at central portions of the lid 20.

A pair of lid-side projections 28A and a pair of lid-side projections 28B projecting toward the bezel 30 are provided on the side of the lid 20 on the side of the bezel 30. The pair of lid-side projections 28A are formed on both sides of the lid-side hole 27B, and the pair of lid-side projections 28B are formed on both sides of the lid-side hole 27C.

Next, a structure of the bezel 30 will be explained.

In the disk-insertion opening 31 formed in the bezel 30, its central portion has the largest width, and the width is reduced toward both sides of the disk-insertion opening 31.

The bezel 30 is formed with a step 32 projecting toward the lid 20 from one side of the bezel 30 parallel to the disk-insertion opening 31. It is preferable that the step 32 comprises one continuously rising piece from one end to the other end of the bezel 30. The step 32 is formed with four lid pawls 33A, 33B, 33C and 33D at equal distances from one another. The lid pawls 33A and 33D are disposed sideway of the bezel 30, and the lid pawls 33B and 33C are disposed at central portions of the bezel 30. The bezel 30 includes first base body pawls 34A and 34B projecting toward the base body 10 from the other end of the bezel 30 parallel to the disk-insertion opening 31. The bezel 30 also includes second base body pawls 36A and 36B projecting toward the base body 10 from both sides of the bezel 30 perpendicular to the disk-insertion opening 31, i.e., from both sides of the bezel 30. The first base body pawls 34A and 34B are formed at their sideway with base body-side projections 35A and 35B. It is preferable that the first base body pawls 34A and 34B are formed at locations to divide a widthwise length of the bezel 30 into three. It is preferable that the second base body pawl 36A and the second base body pawl 36B are provided on diagonal lines of the bezel 30 such that the second base body pawl 36A is closer to the base body 10 and the second base body pawl 36B is closer to the lid 20.

Next, mounting states of the lid 20 and the bezel 30 will be explained especially using FIGS. 3, 6 and 7.

The four lid pawls 33A, 33B, 33C and 33D formed on the bezel 30 are engaged with four lid-side holes 27A, 27B, 27C and 27D formed in the lid 20. In a state in which the lid pawls 33A, 33B, 33C and 33D are engaged with the lid-side holes 27A, 27B, 27C and 27D, the four lid-side projections 28A and 28B abut against the step 32. Since the lid-side projections 28A and 28B abut against the step 32 on both sides of the two lid pawls 33B and 33C disposed at the central side in this manner, even if a local load is applied to the lid 20 and the lid 20 is deformed, this does not have an effect on the engagement between the lid pawls 33B and 33C and the lid-side holes 27B and 27C. In this embodiment, since the step 32 is formed of one continuous rising piece which is parallel to the disk-insertion opening 31, the strength of the bezel 30 in the longitudinal direction can be enhanced and it is possible to prevent the bezel from being deformed.

Next, the mounting states of the base body 10 and the bezel 30 will be explained using especially FIGS. 4, 5 and 6.

The two first base body pawls 34A and 34B formed on the bezel 30 are engaged with the two first base body-side holes 16A and 16B formed in the base body 10. The second base body pawls 36A and 36B formed on the bezel 30 are engaged with the second base body-side holes 17A and 17B formed in the base body 10. The base body-side projections 35A and 35B formed on the bezel 30 are engaged with the third base body-side holes 18A and 18B formed in the base body 10.

Since the first base body pawls 34A and 34B are engaged with the first base body-side holes 16A and 16B, it is possible to prevent the base body 10 and the bezel 30 from deviating or coming off from each other. Since the second base body pawls 36A and 36B are engaged with the second base body-side holes 17A and 17B, it is possible to prevent the base body 10 from deviating or coming off from both sides of the bezel 30. Since the base body-side projections 35A and 35B are inserted into the third base body-side holes 18A and 18B, it is possible to reliably maintain the engagement state between the first base body pawls 34A and 34B and the first base body-side holes 16A and 16B. Since it is possible to prevent the base body 10 and the bezel 30 from deviating or coming off from each other, it is possible to prevent the lid 20 and the bezel 30 from deviating or coming off from each other.

Although the four lid pawls 33A, 33B, 33C and 33D and the four lid-side holes 27A, 27B, 27C and 27D are formed in the embodiment, three or less lid pawls and three or more lid-side holes may be formed at equal distances from each other, or five or more pawls and holes may be formed. One lid pawl may be formed.

Although the two first base body pawls 34A and 34B and the two first base body-side holes 16A and 16B are formed in the embodiment, one pawl and one hole may be formed at the central portion of the bezel 30. Three or more first base body pawls and three or more first base body-side holes may be formed.

Although the step 32 comprises one continuous rising piece from one end to the other end of the bezel 30 in this embodiment, the step 32 and the bezel 30 may be provided at locations corresponding to the lid-side projections 28A and 28B. The step 32 maybe formed by a recess or a hole.

INDUSTRIAL APPLICABILITY

The slot-in type disk apparatus of the present invention is especially useful as a disk apparatus which is incorporated in or integrally set in a so-called notebook personal computer body in which display means, input means and calculating means are integrally formed.

The invention claimed is:

1. A slot-in type disk apparatus comprising:
a base body; and
a lid, the base body and lid forming a chassis sheath; and
a bezel provided on a front surface of said chassis sheath, the bezel including a disk-insertion opening and being configured to receive a disk inserted directly from the disk-insertion opening, wherein:
said bezel includes at least one lid pawl projecting toward said lid from one side of said bezel which is in parallel to said disk-insertion opening, and a step formed adjacent to said at least one lid pawl, said step being parallel with a main surface of the lid,
said lid includes at least one lid-side hole, which is engaged with said at least one lid pawl, and at least one lid-side projection projecting toward the bezel, and
said lid-side projection abuts against a surface of said step that opposes a surface of said step facing the disk insertion opening in a state in which said lid pawl is engaged with said lid-side hole.

2. The slot-in type disk apparatus according to claim 1, wherein said at least one lid pawl comprises at least three lid pawls and said at least one lid-side projection comprises at least two lid-side projections, wherein said at least three lid pawls are disposed at equal distances from each other, said step is formed on both sides of at least one lid pawl disposed at the center of said at least three lid pawls, and said at least two lid-side projections are formed on both sides of said at least one lid-side hole.

3. The slot-in type disk apparatus according to claim 2, wherein said at least one lid pawl comprises at least four lid pawls, wherein two lid pawls disposed at the center of said at least four lid pawls are formed at their both sides with said step, and said at least two lid-side projections are formed on both sides of said at least one lid-side hole.

4. The slot-in type disk apparatus according to claim 1, wherein said step is one continuous step which is in parallel to said disk-insertion opening.

5. The slot-in type disk apparatus according to claim 2, wherein said step is one continuous step which is in parallel to said disk-insertion opening.

6. The slot-in type disk apparatus according to claim 3, wherein said step is one continuous step which is in parallel to said disk-insertion opening.

7. The slot-in type disk apparatus according to claim 1, wherein said bezel includes a first base body pawl projecting toward said base body from the other side of said bezel which is in parallel to said disk-insertion opening, said base body includes a first base body-side hole which is engaged with said first base body pawl, and said first base body pawl is engaged with said first base body-side hole in a state in which said lid pawl is engaged with said lid-side hole.

8. The slot-in type disk apparatus according to claim 1, wherein said bezel includes second base body pawls projecting toward said base body from both sides of said bezel which are perpendicular to said disk-insertion opening, said base body includes second base body-side holes which are engaged with said second base body pawls, and said second base body pawls are engaged with said second base body-side holes in a state in which said lid pawl is engaged with said lid-side hole.

9. The slot-in type disk apparatus according to claim 1, wherein said bezel includes a base body-side projection formed on a side of said base body, said base body includes a third base body-side hole formed on a side of said first base body pawl, and said base body-side projection is inserted in said third base body-side hole in a state in which said lid pawl is engaged with said lid-side hole.

* * * * *